Patented Aug. 2, 1938

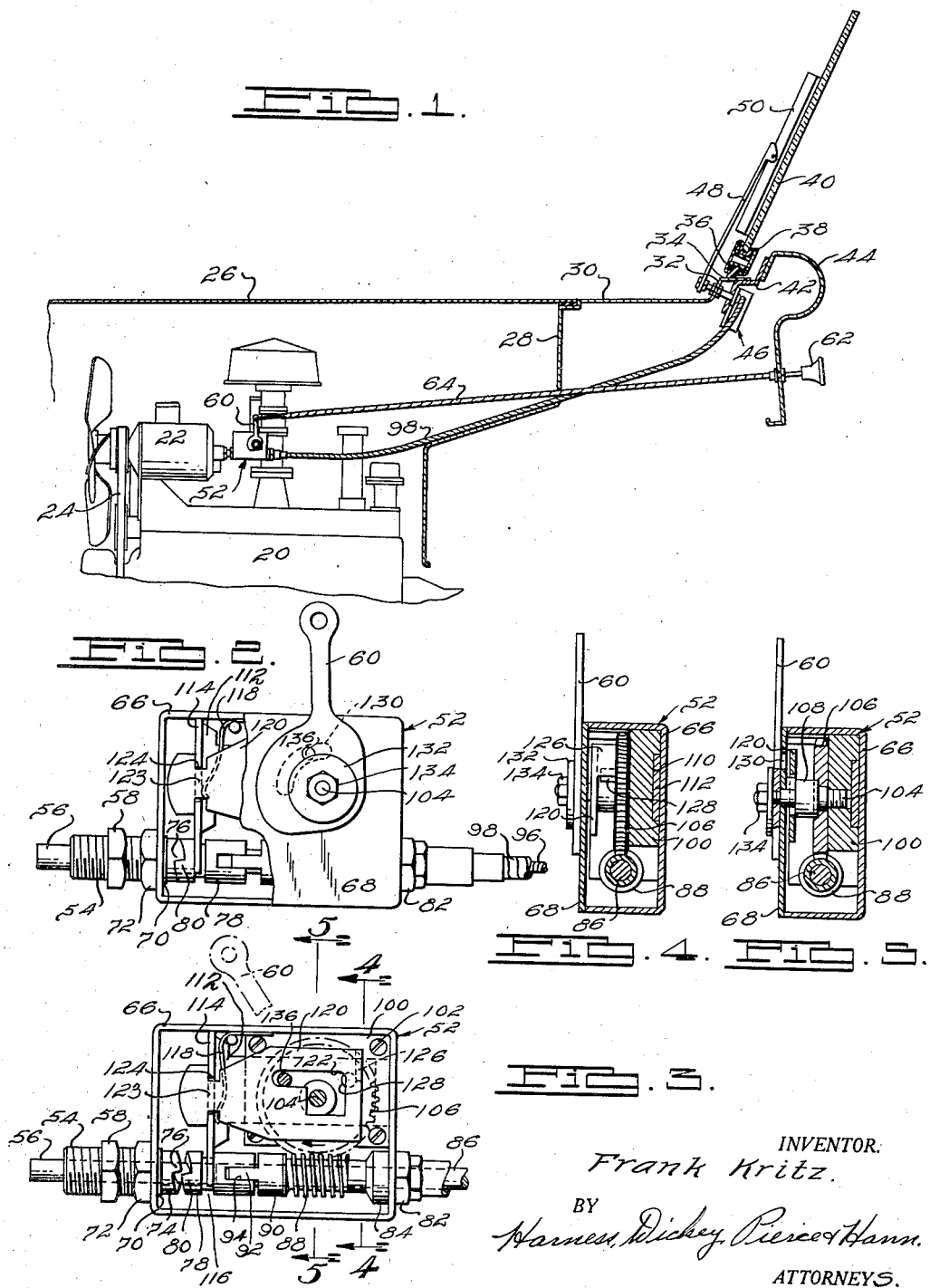

2,125,505

UNITED STATES PATENT OFFICE 2,125,505

CLUTCH CONTROL MECHANISM

Frank Kritz, Detroit, Mich.

Application March 5, 1934, Serial No. 714,010

1 Claim. (Cl. 192—33)

This invention relates to clutch control mechanism, and is particularly, though not necessarily, adapted to control windshield wipers which derive power from a rotating element, whether that element be a usual part of an internal combustion engine or any other rotating element such, for instance, as the shaft of an electric or other motor.

Principal objects include the provision of a clutch control mechanism for windshield wiping mechanisms or the like so constructed and arranged as to employ a portion of the power being transmitted through it for the purpose of controlling its operation; the provision of a control head or unit including a servo mechanism for controlling the application of power therethrough; the provision of a control head or unit for windshield wiper mechanism including a drive shaft and a servo mechanism driven by the drive shaft and controllable to limit the discontinuance of power transmission through the control head or unit to a predetermined position of operation of the wiper blade driven thereby regardless of the time at which the servo mechanism is placed in a condition to limit the application of power therethrough; the provision of a control head or unit including a rotatable shaft and a worm and wheel constantly driven thereby and means cooperable with said worm in one position only of rotation thereof for discontinuing the application of power through the shaft; and the provision of a control head or unit including a rotating shaft and gearing constantly driven thereby together with a manually operable element capable of being moved to a position of control head inoperativeness at any time during the operation of the gear mechanism but so constructed and arranged as to be actuated by an element of the gear mechanism only when such element has substantially reached a predetermined point in its rotatable path, together with means cooperatively associated with the control element for terminating the flow of power through the control head or unit; the provision of a control head or unit for windshield wiper mechanism including a control head or unit having a driving and a driven shaft, gearing driven by the driven shaft and means operated by the gearing and subject to manual control for disconnecting the driving and driven shafts when one of the elements of the gearing has reached substantially a predetermined point in its rotatable path; and the provision of a control head or unit including a driving and a driven shaft and clutching means for connecting said shafts, the clutching means being so constructed and arranged as to disengage the driven shaft from the driving shaft upon an abnormal resistance to moving the driven shaft.

The above being among the objects of the present invention, the same consists in certain novel features of construction and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views, Fig. 1 is a more or less diagrammatic, partially broken, fragmentary, vertical sectional view taken longitudinally through the center of a motor vehicle and particularly that part thereof including the engine and windshield and associated parts, and illustrating a windshield wiper mechanism constructed in accordance with the teachings of the present invention cooperatively associated with the windshield and deriving its power for operation from the engine.

Fig. 2 is an enlarged side elevational view of the power head or unit employed in the windshield wiper construction illustrated in Fig. 1, part of the casing being broken away to disclose certain details of the construction within the casing, the mechanism being shown in operative position.

Fig. 3 is a view similar to Fig. 2 except that the control lever and the cover for the casing has been removed to better disclose the parts contained within the casing, and indicating the position of the mechanism when in inoperative position.

Fig. 4 is a vertical sectional view taken on the line 4—4 of Fig. 3.

Fig. 5 is a vertical sectional view taken on the line 5—5 of Fig. 3.

The illustrative windshield wiper mechanism shown in Fig. 1 includes two main units which for the sake of convenience I term "heads" and which consist of an operating head by means of which the windshield wiper blade is caused to oscillate or otherwise move in a desired path of travel and a control head suitably connected to the operating head and so constructed and arranged as to control the transmission of power from the source of power to the operating head. As a matter of illustration only, in the accompanying drawing a preferred embodiment is shown in which the operating head is mounted in a suitable location adjacent the windshield of a motor vehicle so as to enable it to operate a windshield wiper blade across or over the windshield surface, and the mechanism has been illustrated as deriving its power from a rotating part of the power plant of the vehicle upon which it is mounted, the particular part selected in the present case as a means of illustration comprising the shaft of the usual electric generator, and the control head has been shown as being supported by the generator. It may be noted that it is preferable, although not necessary, that the device supplying the power to the windshield wiper mechanism be located outside of the passenger compartment of the motor vehicle in order to eliminate as far as possible the sensible effect of the operating sounds thereof from the passenger compartment.

Referring now to the drawing, and particularly to Fig. 1, there is indicated generally at 20 an internal combustion engine for a motor vehicle, the engine being provided with the usual electric generator 22 suitably driven from the crankshaft of the engine by means of a belt 24 in accordance with conventional practice. Over the engine 20 is positioned the usual hood 26, the rear edge of which rests upon the upper edge of the usual dash 28. Extending rearwardly from the dash 28 is the usual cowl 30, the upper rear edge of which is bent upwardly as at 32 and then rearwardly as at 34 to provide a shelf against which the usual sealing strip 36 positioned in the frame 38 of the windshield 40 may contact to seal the space between the windshield 40 and the cowl. In the particular construction shown a Z-sectioned member 42 is secured to the underface of the portion 34 of the cowl 30 and extends transversely of the windshield opening and to the upper leg of the member 42 is suitably secured the usual instrument panel 44 which, of course, is located within the driving compartment of the vehicle.

In the particular embodiment of the invention shown the windshield wiper mechanism includes an operating head mounted against the lower leg of the Z-sectioned member 42, its operating shaft projecting forwardly and upwardly through the portion 32 of the cowl and upon the projecting outer end of the shaft is suitably secured an operating arm 48 of a windshield wiper blade 50 adapted to be oscillated back and forth across the face of the windshield 40. The particular construction of the operating arm 48 and wiper blade 50 is unimportant as far as the present invention is concerned and any conventional or known construction may be employed.

In the particular embodiment of the invention shown the control head, indicated generally at 52, for the windshield wiping mechanism is shown mounted on the rear end of the generator 22. This control head, as indicated in Figs. 2 and 3, is provided with a projecting threaded nipple 54 through which the driving shaft 56 projects and in which it has suitable bearing. In the present instance the nipple 54 is shown as threaded into the rear end of the casing for the generator 22 in concentric relation with respect to the operating shaft (not shown) thereof and the driving shaft 56 is adapted for suitable driving connection with the operating shaft of the generator in any well known manner. A lock nut 58 received on the nipple 54 is provided for locking the control head 52 against inadvertent displacement with respect to the generator 22 about the axis of the nipple 54.

The control head 52 is provided with a control lever 60 which, when necessary, may be connected to a remote point of manual control such as the button 62 suitably mounted upon the instrument panel 44 and connected with the lever 60 by any suitable linear transmission device which may be, for instance, of the well known Bowden wire type.

Referring now to Figs. 2 to 5, inclusive, illustrating the details of construction of the control head 52, it will be noted that this includes a casing 66 having a cover 68 closing one side face thereof. The drive shaft 56 is positioned with its axis centrally located between opposite sides of the casing 66 and adjacent one edge thereof. The nipple 54, in which the shaft 56 has bearing, projects within the casing and internally thereof is provided with a shoulder 70 which is drawn against the inner face thereof by a lock nut 72 which thus serves to secure the nipple 54 firmly in place. Immediately inwardly of the shoulder 70 the shaft 56 has secured thereto a collar member 74 having formed on its axially inner surface two ratchet teeth 76, and rotatably mounted upon the shaft 56 inwardly beyond the collar member 74 is a clutch sleeve 78 having ratchet teeth 80, complementary to the teeth 76, formed on that end thereof opposed to the collar member 74. The shaft 56 terminates at a point approximately midway the length of the sleeve member 78, as indicated in Fig. 3 by dotted line.

In the end of the casing opposite to the shaft 56 in axial alignment therewith and secured in place by a nut 82 is a bushing 84 in which the driven shaft 86 is rotatably received. The shaft 86 projects through the bushing 84 into the casing and its inner end is received within and has bearing in the corresponding end of the clutch sleeve 78. Within the casing the shaft 86 is provided with a worm 88 fixed thereto together with a collar member 90 having diametrically opposed axially extending teeth or keys 92 formed on the inner end thereof and which keys slidably but non-rotatably interengage with a diametrically disposed slot 94 formed in the corresponding end of the sleeve member 78. The outer end of the shaft 86 has fixed thereto a flexible linear transmission member 96, which, as indicated in Fig. 2, may take the form of a plurality of telescoped close coiled helical springs wound in alternately opposite directions and it is through this member 96 that power is transmitted from the control member 52 to the operating head 46. Preferably, the member 96 is enclosed within a flexible tubular covering such as 98, of any suitable type, one end of which is fixed to the bushing 84 and the opposite end of which is fixed with respect to the control head 46 in a well known manner.

A block 100 is secured in the upper right hand corner of the casing 66 as viewed in Figs. 2 and 3 by means of screws 102 or other suitable means. The block 100 is centrally provided with an upstanding stud member 104 upon which a worm wheel 106 in constant mesh with the worm 88, is rotatably mounted. The worm wheel 106 is maintained in contact with the upper face of the block 100 by means of a collar 108 formed on the stud 104. As indicated best in Fig. 5, the collar 108 terminates in spaced relation to the inner face of cover 68 and the stud 104 projects upwardly therebeyond through the cover 68. The lower face of the block 100 is provided with a groove 110 extending in parallel relation with respect to the axes of the shafts 56 and 86 and slidably guided for movement in the groove 110 is a plate member 112. As best illustrated in Figs. 2 and 3, the left hand end of the plate member 112 projects beyond the left hand end of the block 100 and is there provided with an integral upstanding member 114 the plane of which is disposed in perpendicular relationship with respect to the axes of the shafts 56 and 86. As illustrated in Figs. 2 and 3, the upper end of the member 114 is extended into substantial contact with the upper wall of the casing 66 and the lower end thereof is bifurcated and is received in a peripheral groove 116 formed in the clutch sleeve 78. A spring 118 co-acting between the casing 66 and the member 114 constantly urges the members 114 and 112 to the left as viewed in Figs. 2 and 3 and, through the engagement between the member 114 and the clutch sleeve 78, urges the clutch sleeve 78 into clutched relation with respect to the collar 74 through interengagement of the ratchet teeth 76 and 80, the sliding interengagement of the keys 92 with the clutch sleeve 78 maintaining the driving relation between the driven shaft 86 and the clutch sleeve 78.

A plate member 120 is relatively loosely received between the cover 68 and the upper end of the collar 108 of the stud 104, the plate 120 being provided with an L-shaped opening 122 therein through the enlarged foot portion of which the stud 104 freely projects. As best brought out in Figs. 2 and 3, the left hand end of the plate member 120 projects in overlapping relationship with respect to the member 114 and at the point of overlap is provided with a neck portion 123 which is received in loosely interlocking relationship with respect to a notch 124 formed in the upper edge of the member 114. From this it will be noted that the plate member 120 and the member 114 are connected together for interrelated sliding movement.

As viewed in Fig. 3, the upper right hand edge of the plate member 120 is provided with an inwardly projecting lug 126, shown more clearly in Fig. 4, which extends into substantially contacting relationship with respect to the adjacent face of the worm wheel 106. The worm wheel 106 is provided with an upstanding pin 128 which is adapted for engagement with the lug 126 in a manner which will hereinafter be more fully explained. The cover 68 is provided with a suitable opening through which the stud 104 projects and, as illustrated in Fig. 2, is also provided with an arcuate slot 130 therein having its center concentric with the axis of the stud 104. The control arm 60 is rotatably received upon the projecting end of the stud 104 exterior to the cover 68 and is maintained thereon in substantial contact with the cover 68 by means of a washer 132 and nut 134. The hub portion of the control arm 60 is made relatively large so as to overlie the slot 130 and thus provide a shield for the same to prevent the entrance of dust or other foreign matter through the slot 130 into the interior of the casing 66.

The arm 60 has a pin 136 fixed thereto and which pin projects through the slot 130 in the cover 68 and into the narrow part of the L-shaped opening 122 in the plate member 120, as indicated in Fig. 3. By moving the control arm 60 about the axis of the stud 104 the pin 136 in engaging the plate member 120 may cause the plate member 120 to pivot about its point of connection with the member 114 at the neck 122 so as to bring the lug 126 either out of the path of travel of the pin 128 on the worm wheel 106 or else into intersecting relation with respect to the path of travel of the pin 128. As will be apparent, when the control arm 60 is in the position indicated in Fig. 2 the pin 136 will have moved upwardly as viewed in that figure and cause the right hand end of the plate member 120 to be moved upwardly carrying with it the lug 126 and moving the lug 126 out of the path of travel of the pin 128. Likewise, it will be noted that when the control arm 60 is moved to the position indicated in Fig. 3 the pin 136 through engagement with the walls of the opening 122 will have caused the member 120 to pivot about the neck 122 and move the right hand end thereof downwardly so as to bring the lug 126 into intersecting relation with respect to the path of travel of the pin 128 of the worm wheel 106.

The normal operative position of the mechanism is that indicated in Fig. 2 in which the control arm 60 is moved to position the lug 126 out of the normal path of travel of the pin 128 and under such circumstances the spring 118 will have urged the member 114, together with the plate member 120, to the left as viewed in Figs. 2 and 3 and the plate member 114 will have moved the clutch sleeve 78 to the left so as to bring its ratchet teeth 80 into driving relation with respect to the teeth 76 on the collar 74. Under such circumstances, if the shaft 56 is rotating it will cause the sleeve member 78 to be rotated and, because of the driving connection between the sleeve member 78 and the collar member 90 by reason of the interengagement of the keys 92 and slot 94, the collar member 90, worm 88 and driven shaft 86 will be rotated equally with the driving shaft 56. When the worm 88 is thus rotated, because of its interengagement with the worm wheel 106, the worm wheel 106 will also be rotated carrying with it the pin 128.

When the control lever is in the position indicated in Fig. 2 the pin 136 fixed thereto will have moved the plate member 120 to a position in which the lug 126 is outside of the normal path of movement of the pin 128 on the worm wheel 106 and consequently continued equal rotation of the shafts 56 and 86 will occur. Should it now be desired to disconnect the driving and driven shafts 56 and 86, respectively, the control lever 60 is moved from the position indicated in Fig. 2 to the position indicated in Fig. 3 and which movement, as has previously been described, will cause the lug 126 to be moved into intersecting relation with respect to the path of travel of the pin 128. When this is done, regardless of the particular rotatable position of the pin 128 at the time of operation of the control arm 60, continued rotation of the worm wheel 106 will eventually bring the pin 128 into contact with the lug 26. When this occurs, due to the fact that the worm wheel 106 is being driven under power from the shaft 56, the worm wheel 106 will continue to rotate and will force the lug 126 and plate member 120 to the right as viewed in Figs. 2 and 3. The plate member 120 in moving to the right will, because of its engagement with the member 114, cause the member 114 and its connected plate member 112 to move with it to the right. Upon moving to the right the member 114, because of its interengagement with the clutch sleeve 78, will cause the sleeve member 78 to likewise move in the same direction and, upon the necessary degree of rotation, the worm wheel 106 will cause the ratchet teeth 76 and 80 to separate from each other and thus disconnect the shaft 86 from the driving shaft 56.

It is to be particularly noted that the only effort on the part of the operator to place the control head in inoperative position is that required to move the control arm 60 which moves only the plate member 120 and the latter, being relatively free and loose, requires substantially no effort in its operation. It is important to observe that upon operation of the control member 60 and corresponding movement of the plate member 120 the mechanism is so conditioned that upon a predetermined point in the rotatable position of the worm wheel 106 the source of power for the drive shaft 56 will itself provide the necessary power to actuate the mechanism to actually disconnect the driving shaft from the driven shaft. Thus a servo mechanism is provided which, regardless of the time of actuation of the control member, will be effective in operation only at a predetermined point in the rotation of the worm wheel 106 to mechanically relieve the driving connection between the driving and driven shafts.

When the mechanism is in inoperative position as indicated in Fig. 3 and it is desired to place it in operative position as indicated in Fig. 2 so that the driving and driven shafts 56 and 58, respectively, will be joined for equal rotation, all that is necessary is to move the control arm 60 from the position indicated in Fig. 3 to that illustrated in Fig. 2, which movement will cause pivoting of the plate member 120 about its neck 122 to disengage the lug 126 from the pin 128. As soon as this occurs the spring 118 will force the plate 120 and the member 114, together with the clutch sleeve 78, to the left as viewed in Figs. 2 and 3 and again place the clutch mechanism in engaged position.

It will be appreciated that the mechanism immediately associated with the operating head 42 is so arranged that when the pinion 106 of the clutch control mechanism is in a stopping position, the windshield wiper blade 48 is in a position corresponding to a selected one of its limit positions at the side of the normal field of vision.

Referring particularly to Figs. 2 and 3, it will be noted that the driving faces of the ratchet teeth 76 and 80 are not in a plane parallel to the axes of the shafts which they connect, but instead are slightly inclined with respect thereto and in such a manner that the turning force transmitted through these teeth exerts an axial component tending to disengage the clutch. Under ordinary conditions of operation the force of the spring 118 acting through the member 114 is sufficient to overcome the axial component of the force being transmitted between the shafts 56 and 86 tending to disengage the clutch, but the inclination of the driving faces of the ratchet teeth is so arranged that an unusual resistance to oscillation of the wiper blade 50, for instance, will build up the force tending to separate the elements of the ratchet clutch to a point sufficient to overcome the force of the spring 18 and actually cause the teeth 76 and 80 to separate and slip over one another. This construction provides a safety means whereby possibility of rupture of the mechanism is eliminated should the wiper blade 50 become frozen to the windshield 40, in case the wiper blade 50 is manually held against movement during operation of the mechanism or forced to move when the mechanism is not operating or, if for any other reason something occurs to prevent normal movement of a part of the mechanism.

In accordance with the above explanation, it will be apparent that when the windshield wiping mechanism here described is operating and it is desired to discontinue its operation all that is necessary is to move the button 62 on the instrument panel 44 to its inoperative position which will move the control arm 60 on the control head 52 to its inoperative position and, upon continued movement of the mechanism, the pin 128 on the worm wheel 106 will be brought into contact with the lug 126 on the plate member 120 and through the member 114 power derived from the driving means will cause the power shaft to be disconnected from the windshield wiping mechanism and this at a time that the windshield wiping mechanism including the wiper arm 48 is in a predetermined position of operation.

Upon disclosure of the teachings herein, those skilled in the art will readily perceive various changes and modifications that may be made in the specific embodiment of the invention described while still maintaining the principles of construction and operation here disclosed and, accordingly, it is to be understood that formal changes may be made in the specific embodiments of the invention described without departing from the spirit and substance of the broad invention, the scope of which is commensurate with the appended claim.

I claim:

In a mechanical power transmission system having a driving shaft, a driven shaft axially aligned therewith, and a clutch movable to connect and disconnect said shafts, the combination of a member directly driven in rotation by one of said shafts and having a laterally extending projection offset from the axis thereof, a plate positioned at one side of and in overlapping relation to the member, said plate being slidably guided for movement in a plane substantially parallel to the plane of the member and having a part operatively engaging the clutch, a shiftable plate positioned at the opposite side of and in overlapping relation to the member, for movement in a plane substantially parallel to the plane of the member, said shiftable plate having a projecting part thereon for cooperation with said projection and being operatively connected to said first mentioned plate, and a control arm connected to said shiftable plate and actuable to pivot said shiftable plate between a position in which said projecting part is in the path of said projection and a position in which said projecting part is outside of the path of said projection.

FRANK KRITZ.